United States Patent
Zyren

(10) Patent No.: US 8,571,118 B2
(45) Date of Patent: Oct. 29, 2013

(54) TRANSMISSION LINE DIRECTIONAL COUPLING

(75) Inventor: James Zyren, Melbourne Beach, FL (US)

(73) Assignee: QUALCOMM Incorporated, San Diego, CA (US)

( * ) Notice: Subject to any disclaimer, the term of this patent is extended or adjusted under 35 U.S.C. 154(b) by 836 days.

(21) Appl. No.: 12/421,543

(22) Filed: Apr. 9, 2009

(65) Prior Publication Data

US 2009/0290650 A1 Nov. 26, 2009

Related U.S. Application Data

(60) Provisional application No. 61/043,581, filed on Apr. 9, 2008.

(51) Int. Cl.
*H04L 25/03* (2006.01)

(52) U.S. Cl.
USPC .......................................................... 375/257

(58) Field of Classification Search
USPC ........... 320/109; 333/161, 164; 370/206, 516; 375/219, 226, 257; 455/69, 402, 562; 705/34
See application file for complete search history.

(56) References Cited

U.S. PATENT DOCUMENTS

| | | |
|---|---|---|
| 2,931,901 A | 4/1960 | Markusen |
| 4,084,133 A | 4/1978 | Zimmer et al. |
| 4,864,589 A | 9/1989 | Endo |
| 4,876,549 A | 10/1989 | Masheff |
| 5,398,542 A | 3/1995 | Vasbinder |
| 5,497,142 A | 3/1996 | Chaffanjon |
| 5,724,047 A | 3/1998 | Lioio et al. |
| 6,281,841 B1 | 8/2001 | Nevill |
| 6,300,881 B1 | 10/2001 | Yee et al. |
| 6,313,795 B1 | 11/2001 | Herrmann et al. |
| 7,307,512 B2 | 12/2007 | Yaney et al. |
| 7,414,962 B2 | 8/2008 | Izumi |
| 7,701,325 B2 | 4/2010 | White, II |
| 8,368,349 B2 | 2/2013 | Zyren |
| 8,368,351 B2 | 2/2013 | Zyren |
| 2003/0039317 A1 | 2/2003 | Taylor et al. |
| 2003/0169155 A1 | 9/2003 | Mollenkopf et al. |
| 2004/0227622 A1 | 11/2004 | Giannini et al. |
| 2006/0087346 A1 | 4/2006 | Ishida et al. |
| 2006/0259254 A1 | 11/2006 | Swartztrauber et al. |
| 2007/0135085 A1 | 6/2007 | Iwamura |

(Continued)

FOREIGN PATENT DOCUMENTS

| | | |
|---|---|---|
| WO | WO 2006/012681 | 2/2006 |
| WO | WO 2006/047270 | 5/2006 |
| WO | WO 2006/118850 | 11/2006 |

OTHER PUBLICATIONS

"HomePlug AV White Paper", 2005, 11 Pages.*

(Continued)

*Primary Examiner* — Sam K Ahn
*Assistant Examiner* — Shawkat M Ali
(74) *Attorney, Agent, or Firm* — DeLizio Gilliam, PLLC

(57) ABSTRACT

Coupling signals to a transmission line over a plurality of taps includes coupling a first signal onto a transmission line at a first tap, coupling a second signal onto a transmission line at a second tap, and controlling a phase for at least a portion of the first signal relative to a phase for a corresponding portion of the second signal.

70 Claims, 6 Drawing Sheets

(56) References Cited

U.S. PATENT DOCUMENTS

| | | |
|---|---|---|
| 2008/0040296 A1 | 2/2008 | Bridges et al. |
| 2008/0096500 A1* | 4/2008 | Eilts et al. .................... 455/136 |
| 2009/0212762 A1 | 8/2009 | Van Oevelen et al. |
| 2009/0228223 A1 | 9/2009 | Liu et al. |
| 2009/0261779 A1 | 10/2009 | Zyren |
| 2010/0274697 A1 | 10/2010 | Zyren |
| 2013/0099743 A1 | 4/2013 | Zyren |

OTHER PUBLICATIONS

International Search Report and Written Opinion in PCT Application No. PCT/US2010/039615, dated Aug. 19, 2010, 12 pages.

International Search Report and Written Opinion in PCT Application No. PCT/US2009/040078, dated Jun. 5, 2009, 12 pages.

Co-pending U.S. Appl. No. 13/712,876, filed Dec. 12, 2012, 32 pages.

"U.S. Appl. No. 12/421,452 Office Action", 18 pages, Apr. 9, 2009.

"U.S. Appl. No. 13/712,876 Office Action", Aug. 15, 2013, 14 pages.

* cited by examiner

TRANSMISSION LINE DIRECTIONAL COUPLING

CROSS-REFERENCE TO RELATED APPLICATIONS

This application claims priority to U.S. Application Ser. No. 61/043,581, filed on Apr. 9, 2008, incorporated herein by reference.

TECHNICAL FIELD

The invention relates to transmission line directional coupling.

BACKGROUND

Power Line Communications (PLC) is a rapidly growing market. PLC is attractive because it uses existing power lines that are ubiquitous in homes and businesses around the world. PLC products have proven to be very successful for in-home data distribution. However, other market segments such as Smart Grid (power utilities controlling power distribution infrastructure and major electrical loads) and Access BPL (use of power lines to provide high speed internet access to customers not served by cable or DSL) call for broadband data to be transmitted to homes and businesses over outdoor power lines.

Due to limited bandwidth (e.g., 2-80 MHz) and regulatory limits on radio frequency emissions, digital transmissions over power line have limited range, typically 1-2 km. In order to propagate signals over longer distances on a power line, digital repeaters are mounted on pole tops at distances corresponding to the range limitations of the power line. Reaching customers located at the extreme end of a power line can requires as many as 25 hops.

Transmissions requiring several hops consume a relatively large amount of available bandwidth—thereby reducing the available bandwidth not only for customers at the extreme end of the power line, but also for other customers sharing that particular line. Additionally, signals transmitted by a repeater typically propagate in both directions, "upstream" toward the head end and "downstream" toward remote customers. In many cases, there is only a need to send the data in one given direction, depending on the relative location of the source and destination stations. Sending data in the unwanted direction may result in interference to other data transmissions on the power line. This reduces the throughput level that would otherwise be possible. Thus, spatial reuse of the transmission line is limited, which results in a waste of valuable bandwidth in such cases.

Limited propagation distance on power lines also gives rise to another issue—the "hidden node" problem. PLC devices typically share the medium via a Carrier Sense Multiple Access—Collision Avoidance (CSMA-CA) mechanism. This is essentially a listen-before-talk scheme. If the medium is busy, a station will wait until the medium is idle before sending any queued data. The hidden node problem arises when a repeater is receiving information from a first transceiver, while a second transceiver which is beyond the range of the signal from the first transceiver begins transmission before the completion of the packet from the first transceiver. In this case, a collision may occur and both packets can be lost. This can be a serious problem, particularly at peak utilization times. These collisions most often occur because the second transceiver is physically located further from the first transmitter than the receiving repeater. In the majority of cases, the signal from the first and second transceivers arrive from different directions.

SUMMARY

In one aspect, in general, an apparatus comprises: multiple transmission line taps; and a signal processing unit in communication with each of the taps, wherein the signal processing unit is configured to control a phase for at least a portion of a signal for at least a first of the taps relative to a phase for a corresponding portion of the signal for at least a second of the taps.

Aspects can include one or more of the following features.

Controlling the phase for the portion of the signal for the first of the taps comprises determining the phase based at least in part on a direction in which a signal is to be coupled between the taps and a transmission line.

Controlling the phase for the portion of the signal for the first of the taps comprises determining a sign of the phase based at least in part on the direction.

Controlling the phase for the portion of the signal for the first of the taps comprises controlling the phase to tune an amplitude of a combined signal from the taps that propagates away from the taps.

Tuning the amplitude of the combined signal comprises reducing the amplitude of the combined signal in one direction away from the taps.

Tuning the amplitude of the combined signal comprises increasing the amplitude of the combined signal in one direction away from the taps.

The signal processing unit is further configured to control an amplitude of the portion of the signal for the first of the taps relative to an amplitude of a corresponding portion of the signal for the second of the taps.

The signal comprises multiple subcarriers, and the signal processing unit is configured to determine a phase for each subcarrier for at least a first of the taps relative to a phase for a corresponding subcarrier for at least a second of the taps.

The corresponding subcarrier for the second of the taps has the same frequency as the subcarrier for the first of the taps.

The signal processing unit is configured to determine a phase and an amplitude for each subcarrier for the first of the taps relative to a phase and an amplitude of a corresponding subcarrier for the second of the taps.

The apparatus further comprises multiple transceivers each coupled to a respective one of the taps and coupled to the signal processing unit.

The apparatus further comprises a transceiver coupled to each of the taps and coupled to the signal processing unit.

Controlling the phase for the portion of the signal for the first of the taps comprises controlling the phase to be approximately equal to a difference between a constant term and a term proportional to a frequency of the portion of the signal and a distance between the first and second taps.

The frequency of the portion of the signal corresponds to a frequency at a peak of a spectrum of the portion of the signal.

The portion of the signal comprises a subcarrier of the signal.

The distance between the first and second taps is proportional to a center wavelength corresponding to a center of a bandwidth over which a spectrum of the signal spans.

The distance between the first and second taps is approximately equal to the center wavelength divided by four.

Controlling the phase for the portion of the signal for the first of the taps comprises determining a phase that provides at least a partial null in an array factor for signals coupled between a transmission line and first and second taps in one direction on the transmission line.

The determined phase provides gain in the array factor for signals coupled between the transmission line and the first and second taps in the opposite direction on the transmission line.

The signal processing unit is configured to determine a signal strength for each subcarrier for a specified direction on the transmission line and to determine amplitudes and phases for each subcarrier for each of the taps that provide at least a partial null in the array factor for the specified direction.

The signal processing unit is configured to determine a signal strength for each subcarrier for a specified direction on the transmission line and to determine amplitudes and phases for each subcarrier for each of the taps that provide at least some gain in the array factor for the specified direction.

The determined signal strength is provided as feedback based on a signal strength received from a device coupled to the transmission line in the specified direction.

The signal processing unit is configured to use the feedback to adaptively control subcarrier amplitudes and phases to compensate for changes in characteristics of the transmission line.

The signal processing unit is configured to transmit signals from the first and second taps to the transmission line according to the array factor.

The signal processing unit is configured to receive signals from the transmission line to the first and second taps according to the array factor.

The signal processing unit is configured to: determine a first set of amplitude values for modulating each subcarrier of a first signal to be transmitted from the first tap, and determine a first set of phase values for modulating each subcarrier of the first signal; and determine a second set of amplitude values for modulating each subcarrier of a second signal to be transmitted from the second tap based on the first set of amplitude values, and determine a second set of phase values for modulating each subcarrier of the second signal based on the first set of phase values.

Each phase value in the second set of phase values is approximately equal to the phase value of the same subcarrier in the first set of phase values offset by a relative phase shift that is controlled by the signal processing unit.

Each amplitude value in the second set of amplitude values is approximately equal to the amplitude value of the same subcarrier in the first set of amplitude values.

Each amplitude value in the second set of amplitude values is approximately equal to the amplitude value of the same subcarrier in the first set of amplitude values scaled by a factor that at least partially compensates for an amplitude taper over a bandwidth over which the multiple subcarriers span, where the amplitude taper corresponds to a difference between a frequency of a subcarrier and a center frequency of the bandwidth.

Processing the signal comprises transmitting the first signal from the first tap and transmitting the second signal from the second tap at approximately the same time.

The signal processing unit is configured to: determine a first set of phase values for processing each subcarrier of a first signal received from the first tap; and determine a second set of phase values for processing each subcarrier of a second signal received from the second tap based on the first set of phase values.

The signal processing unit is configured to receive the first signal from the first tap and receive the second signal from the second tap at approximately the same time.

The signal processing unit is configured to process a subcarrier of the first signal using a phase value from the first set of phase values to recover a first vector, process a corresponding subcarrier of the second signal using a phase value from the second set of phase values to recover a second vector, and combine the first and second vectors according to a relative phase to recover a data value.

The signal processing unit is configured to control the relative phase according to a direction in which the data value is being received from a transmission line coupled to the taps.

The signal processing unit is configured to simultaneously transmit a first signal in one direction on a transmission line coupled to the taps and transmit a second signal different from the first signal in another direction on the transmission line.

The signal processing unit is configured to simultaneously receive a first signal from one direction on a transmission line coupled to the taps and receive a second signal different from the first signal from another direction on the transmission line.

In another aspect, in general, a method for coupling signals to a transmission line over a plurality of taps comprises: coupling a first signal onto a transmission line at a first tap; coupling a second signal onto a transmission line at a second tap; and controlling a phase for at least a portion of the first signal relative to a phase for a corresponding portion of the second signal.

In another aspect, in general, a method comprises: transmitting a payload bearing packet in a first direction on a transmission line; and transmitting a packet in a different direction on the transmission line that includes information about the payload bearing packet.

Aspects can include one or more of the following features.

The information about the payload bearing packet comprises one or more of a source address, a destination address, and a time duration of transmission.

The packet that includes information about the payload bearing packet is prioritized below acknowledgement packets and above payload bearing packets for accessing the transmission line according to a medium access protocol.

The packet that includes information about the payload bearing packet is combined with a different payload bearing packet being transmitted in the different direction on the transmission line.

Among the many advantages of the invention (some of which may be achieved only in some of its various aspects and implementations) are the following.

The disclosed directional coupling techniques enable sending signals either direction on a power line, as dynamically selected by a transmitting station. The other direction can be selectively nulled across a broad bandwidth of the power line signal, e.g., including all of the carriers in an Orthogonal Frequency Division Multiplexing (OFDM) modulation scheme. The techniques also enable receiving signals from either direction on the power line, as dynamically selected by a receiving station. For example, even in the presence of potentially interfering signals or noise from one direction, a receiving station can ignore the interfering signals or noise and receive signals arriving from the other direction. Aside from rejecting undesired signals or interference from the undesired directions, the techniques can increase receiver sensitivity to signals arriving from the desired direction. The techniques also enable simultaneously transmitting two different signals (e.g., separate packets) in two separate directions, or simultaneously receiving two different signals from two separate directions. These directional coupling techniques can be used with medium access techniques such as the "NOLOAD" packets described herein, and can double the effective throughput of a series of repeaters on a power line and can mitigate or eliminate the hidden node problem.

Other features and advantages of the invention will be found in the detailed description, drawings, and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
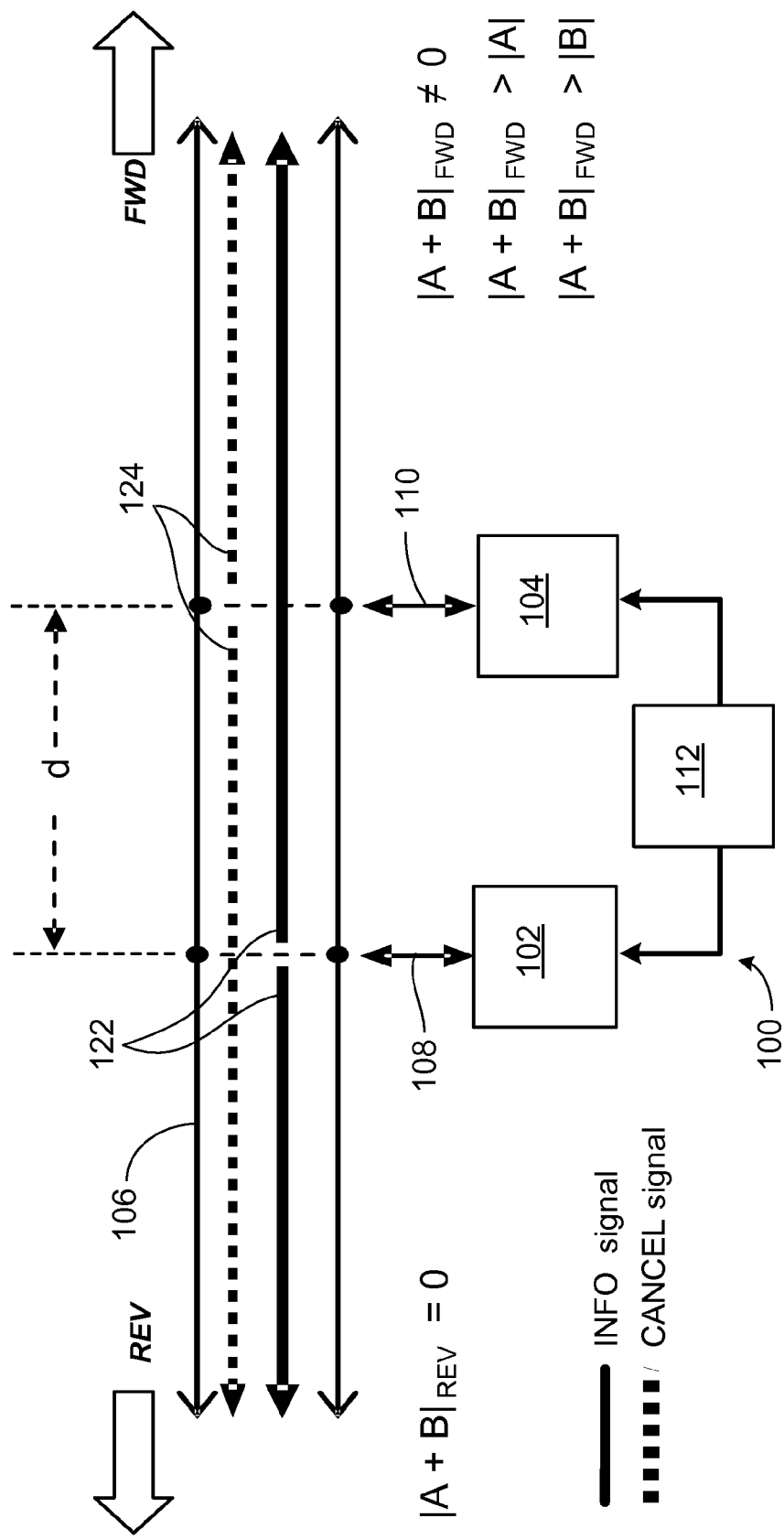
FIG. 1 is a schematic diagram of a power line directional coupler.

Referring to FIG. 1, a directional coupler 100 includes a first transceiver 102 and a second transceiver 104 coupled to a transmission line 106 (e.g., a power line) through respective taps. The tap 108 (or "tap A") for the first transceiver 102 and the tap 110 (or "tap B") for the second transceiver 104 are coupled to the transmission line 106 separated by a physical distance "d" along the power line of approximately ¼ of a wavelength at the center of the frequency band used for modulating signals. Equivalently, this separation distance is the distance at which a sinusoidal signal propagating from one tap to the other undergoes a phase shift due to propagation of 90 degrees. For example, for a PLC system operating at 30-50 MHz, the separation would be approximately 1.25 meters, assuming a propagation velocity on the power line of ⅔ the speed of light in a vacuum. Other systems may operate over other frequency ranges (e.g., 2-28 MHz). The spacing of the two taps at a distance of approximately a quarter wavelength at the center frequency of the band is used in some implementations because it enhances forward gain. However, other factors such as physical coupler size may dictate that the directional coupler is implemented with a tap spacing other than a quarter wavelength at center frequency.

Any of a variety of modulation schemes may be implemented by the synchronized transceivers 102 and 104, that convert data to and from a signal waveform that is transmitted over the transmission line 106. One exemplary modulation scheme is OFDM. To illustrate how the directional coupler 100 functions, the operation of the system with an OFDM modulation scheme will be described in detail. First the OFDM modulation scheme for signals coupled to and from an individual tap will be described to explain OFDM concepts, and then additional techniques for processing the signals for the multi-tap directional coupler will be described.

In OFDM modulation generally, data are transmitted in the form of OFDM "symbols." Each symbol has a predetermined time duration or symbol time $T_s$. Each symbol includes a Guard Interval (to combat the effects of multipath distortion) and a Fast Fourier Transform (FFT) evaluation period ($T_{FFT}$). OFDM symbols are generated from a superposition of N sinusoidal waveforms that are orthogonal to each other over the period $T_{FFT}$ and form the OFDM subcarriers. Each subcarrier has a peak frequency $f_i$ and a phase $\Phi_i$ measured from the beginning of the symbol. For each of these mutually orthogonal subcarriers, a whole number of periods of the sinusoidal waveform is contained within the symbol time $T_{FFT}$. Equivalently, each subcarrier frequency is an integral multiple of a frequency interval $\Delta f=1/T_{FFT}$. The phases $\Phi_i$ and amplitudes $A_i$ of the subcarrier waveforms can be independently selected (according to an appropriate modulation scheme) without affecting the orthogonality of the resulting modulated waveforms. The subcarriers occupy a frequency range between frequencies $f_1$ and $f_N$ referred to as the OFDM bandwidth.

Figure 2:
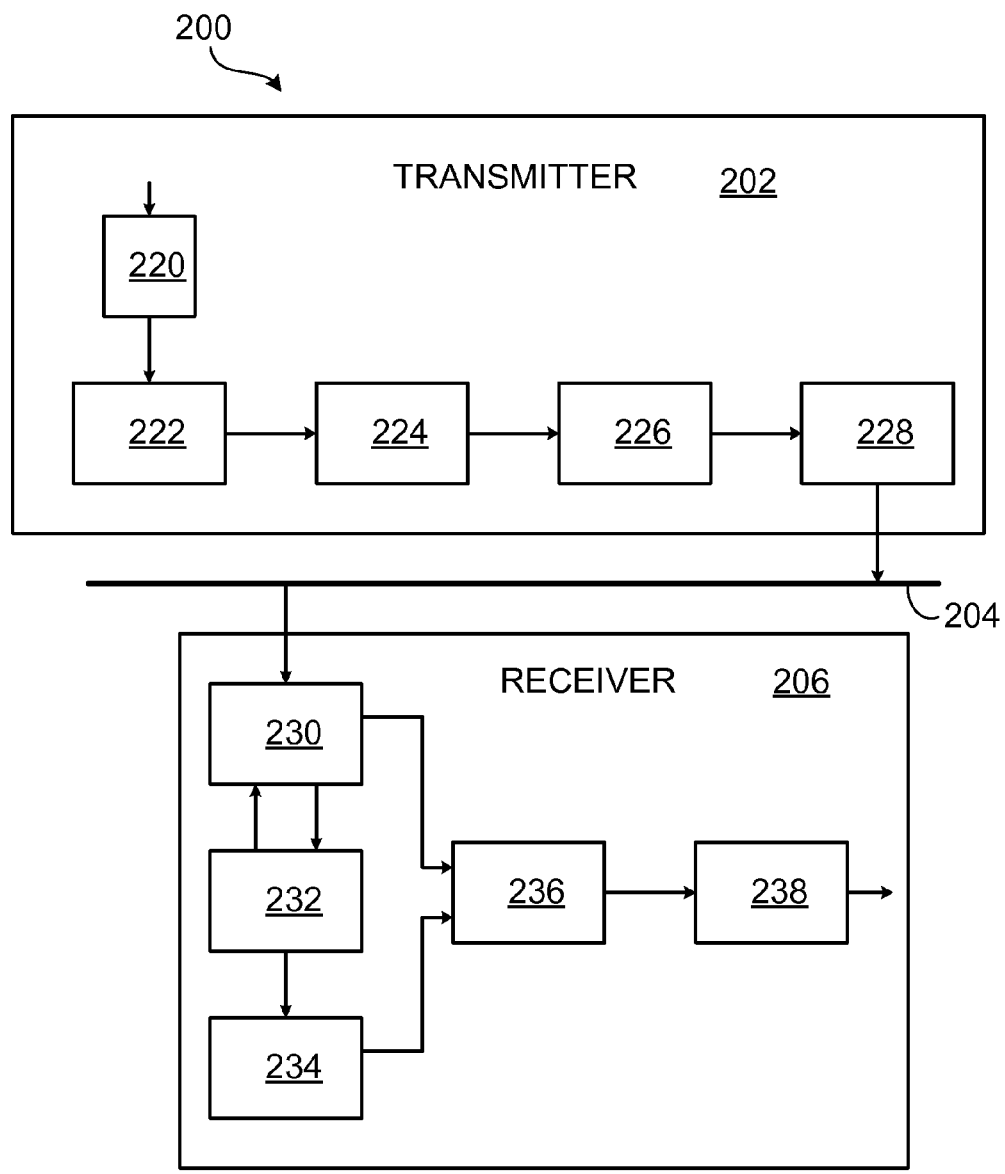
FIG. 2 is a block diagram of a communication system implementing a modulation scheme.

Referring to FIG. 2, a communication system 200 includes a transmitter 202 for transmitting a signal (e.g., a sequence of OFDM symbols) over a communication medium 204 to a receiver 206. The transmitter 202 and receiver 206 can both be incorporated into a network interface module at each station. The communication medium 204 can represent a path from one device to another over the transmission line 106.

At the transmitter 202, modules implementing the physical (PHY) layer receive a data unit from the medium access control (MAC) layer. The data unit is sent to an encoder module 220 to perform processing such as scrambling, error correction coding and interleaving.

The encoded data is fed into a mapping module 222 that takes groups of data bits (e.g., 1, 2, 3, 4, 6, 8, or 10 bits), depending on the constellation used for the current symbol (e.g., a binary phase shift keyed (BPSK), quadrature phase shift keyed (QPSK), 8 point Quadrature Amplitude Modulated (8-QAM), 16-QAM, 64-QAM, 256-QAM, or 1024-QAM constellation), and maps the data value represented by those bits onto the corresponding amplitudes of in-phase (I) and quadrature-phase (Q) components of a subcarrier waveform of the current symbol. This results in each data value being associated with a corresponding complex number $C_i=A_i \exp(j\Phi_i)$ whose real part corresponds to the I component and whose imaginary part corresponds to the Q component of a subcarrier with peak frequency $f_i$. Alternatively, any appropriate modulation scheme that associates data values to modulated subcarrier waveforms can be used.

The mapping module 222 also determines which of the subcarrier frequencies $f_1, \ldots, f_N$ within the OFDM bandwidth are used by the system 200 to transmit information. For example, some subcarriers that are experiencing fades can be avoided, and no information is transmitted on those subcarriers. Instead, the mapping module 222 uses coherent BPSK modulated with a binary value from the Pseudo Noise (PN) sequence for that subcarrier. For some subcarriers (e.g., a subcarrier i=10) that correspond to restricted bands (e.g., an amateur radio band) on a medium 204 that may radiate power no energy is transmitted on those subcarriers (e.g., $A_{10}=0$). The mapping module 222 also determines the type of modulation to be used on each of the subcarriers (or "tones") according to a "tone map." The tone map can be a default tone map, or a customized tone map determined by the receiving station, as described in more detail below.

An inverse discrete Fourier transform (IDFT) module 224 performs the modulation of the resulting set of N complex numbers (some of which may be zero for unused subcarriers) determined by the mapping module 222 onto N orthogonal subcarrier waveforms having peak frequencies $f_1, \ldots, f_N$. The modulated subcarriers are combined by IDFT module 224 to form a discrete time symbol waveform S(n) (for a sampling rate $f_R$), which can be written as $$S(n) = \sum_{i=1}^{N} A_i \exp[j(2\pi i n/N + \Phi_i)] \qquad \text{Eq. (1)}$$

where the time index n goes from 1 to N. $A_i$ is the amplitude and $\Phi_i$ is the phase of the subcarrier with peak frequency $f_i=(i/N)f_R$, and $j=\sqrt{-1}$. In some implementations, the discrete Fourier transform corresponds to a fast Fourier transform (FFT) in which N is a power of 2.

A post-processing module 226 combines a sequence of consecutive (potentially overlapping) symbols into a "symbol set" that can be transmitted as a continuous block over the communication medium 204. The post-processing module 226 prepends a preamble to the symbol set that can be used for automatic gain control (AGC) and symbol timing synchronization. To mitigate intersymbol and intercarrier interference (e.g., due to imperfections in the system 200 and/or the communication medium 204) the post-processing module 226 can extend each symbol with a cyclic prefix, or Guard Interval, that is a copy of the last part of the symbol. The post-processing module 226 can also perform other functions such as applying a pulse shaping window to subsets of symbols within the symbol set (e.g., using a raised cosine window or other type of pulse shaping window) and overlapping the symbol subsets.

An Analog Front End (AFE) module 228 couples an analog signal containing a continuous-time (e.g., low-pass filtered) version of the symbol set to the communication medium 204. The effect of the transmission of the continuous-time version of the waveform S(t) over the communication medium 204 can be represented by convolution with a function g(τ;t) representing an impulse response of transmission over the communication medium. The communication medium 204 may add noise n(t), which may be random noise and/or narrowband noise emitted by a jammer.

At the receiver 206, modules implementing the PHY layer receive a signal from the communication medium 204 and generate an data unit for the MAC layer. An AFE module 230 operates in conjunction with an Automatic Gain Control (AGC) module 232 and a time synchronization module 234 to provide sampled signal data and timing information to a discrete Fourier transform (DFT) module 236.

After removing the cyclic prefix, the receiver 206 feeds the sampled discrete-time symbols into DFT module 236 to extract the sequence of N complex numbers representing the encoded data values (by performing an N-point DFT). Demodulator/Decoder module 238 maps the complex numbers onto the corresponding bit sequences and performs the appropriate decoding of the bits (including deinterleaving and descrambling).

Referring back to FIG. 1, the directional coupler 100 uses a PHY layer modulation scheme, for example OFDM, with the added feature suppressing the signal transmitted or received in one direction of propagation on the transmission line 106. In this example, the two transceivers 102 and 104 are controlled by a common signal processing unit 112. The signal processing unit 112 enables the signals transmitted and received by the transceivers 102 and 104 to be processed using common signal references, such as a common clock reference, which can be used to define a common phase reference for setting relative phases between the subcarriers of the two transceivers. In some implementations, the signal processing unit 112 generates baseband signal characteristics such as amplitudes and phases to be used for modulating respective subcarrier frequencies in a multi-carrier modulation scheme (e.g., OFDM as described in more detail above and in U.S. Publication No. 2006/0256881 A1 and U.S. Application No. 60/941,949, each of which is incorporated herein by reference). At tap A, an information bearing signal 122, designated INFO, is coupled onto the transmission line 106 by the first transceiver 102. At tap B, a second signal 124, designated CANCEL, with a predetermined relationship to the INFO signal is coupled onto the transmission line 106 by the second transceiver 104.

The purpose of the CANCEL signal 124 is to null the INFO signal 122 in the undesired (REVERSE) direction. Because of the predetermined physical distance between the signal taps and the predetermined phase relationships between subcarriers emanating from the signal taps, as described in more detail below, the two signals combine constructively in the desired (FORWARD) direction—thus providing gain in the FORWARD direction. For the purpose of illustration, assume that there are no major signal impairments or impedance mismatches in either the FORWARD or REVERSE directions. In this idealized situation, the CANCEL signal uses the same subcarrier amplitudes as the INFO signal with a predetermined phase shift (or "rotation") of each subcarrier of the OFDM signal such that the two signals nullify each other in the REVERSE direction. The exact phase rotation for each subcarrier is dependent on the distance, d, between the two signal taps, A 108 and B 110, and the frequency of the subcarrier.

The predetermined relative phase shift between subcarriers at tap A 108 and tap B 110 are established explicitly or implicitly based on a common phase reference at tap A and tap B. The transceivers 102 and 104 couple signals to and from the taps according to a common phase reference that is provided, for example, by the signal processing unit 112, or established by some technique for establishing a common phase reference (e.g., using synchronized clocks as described in U.S. Publication No. 2007/0025398 A1, incorporated herein by reference). For signal transmission, dynamically controlled phase shifts between subcarriers generated at tap A and tap B, relative to this common phase reference, enable dynamically selectable cancellation in the REVERSE direction and constructive interference in the FORWARD direction.

An imposed relative phase shift β(λ) of a subcarrier of wavelength λ within the CANCEL signal 124 relative to the same subcarrier in the INFO signal 122 can be determined as follows. The phase shift Φ(λ) acquired due to signal propagation of the subcarrier over physical distance "d" is:

$$\Phi(\lambda)=2\pi d/\lambda \qquad \text{Eq. (2)}$$

where λ is the wavelength of the subcarrier on the transmission line 106. Thus, the acquired phase shift is proportional to the distance between the taps divided by the wavelength of the subcarrier on the transmission line, or equivalently, proportional to the distance between the taps multiplied by frequency of the subcarrier where the frequency f=v/λ (where v is the propagation speed on the transmission line). (Typically, a subcarrier has a spectrum with a spectral shape that has a maximum value (or "peak") at a "peak frequency" and tapers off away from the peak frequency. For example, in OFDM modulation the subcarriers have a spectral shape that is approximately a sinc function. The wavelength or frequency of the subcarrier corresponds to the wavelength or frequency at a peak of the spectrum.) In the REVERSE direction, when the CANCEL subcarrier signal 124 propagating from tap B 110 (shown as the dashed line) reaches tap A 108, it is combined with the INFO subcarrier signal 122 propagating from tap A (shown as the solid line). The resulting combined signal will be cancelled if the sum of the imposed relative phase β(λ) and the acquired relative phase shift Φ(λ) add to π(or 180 degrees). The imposed relative phase shift β(λ) for a given subcarrier (having a wavelength λ) in the CANCEL signal at Tap B is computed as:

$$\beta(\lambda) = \pi - \Phi(\lambda) \qquad \text{Eq. (3)}$$

In this case, the amplitude of the subcarriers in the CANCEL signal are identical to those in the INFO signal.

In the FORWARD direction, the INFO subcarrier signal 122 (shown as the solid line) starts propagating from tap A 108 with a phase shift of −β(λ) relative to the same subcarrier in the CANCEL signal 124. When the INFO subcarrier signal reaches tap B 110, it is combined with the CANCEL signal propagating from tap B (shown as the dashed line) according to a total phase that is the sum of the initial relative phase shift −β(λ) and the acquired relative phase shift Φ(λ), which adds to Φ(λ)−β(λ). For the subcarrier for which the distance d is λ/4, the acquired relative phase shift Φ(λ) is π/2 and the imposed relative phase shift β(λ) is π−π/2=π/2. Thus, for this subcarrier, the INFO subcarrier signal is combined with the CANCEL subcarrier signal according to a total relative phase shift of zero, resulting in a doubling of the signal amplitude. For subcarriers for which λ/4 is less than or greater than the distance d, the INFO and CANCEL subcarrier signals are added with a nonzero relative phase 4πd/λ−π, but still add constructively over a relatively large wavelength range.

The designation of which transceiver provides the "INFO" signals and which provides the "CANCEL" signals is arbitrary, such that the choice of direction in which signals are canceled and direction in which signals constructively add can be controlled dynamically depending on the desired destination of a signal. To control the direction, the directional coupler 100 applies the appropriate relative phase shift by imposing a phase shift on either or both of the taps. For example, to switch directions, the INFO and CANCEL signals can each be applied to different taps such that the imposed phase shift β(λ) is applied to the signal at tap A 108 instead of the signal at tap B 110. Equivalently, to switch directions, the INFO and CANCEL signals can be applied to the same taps with the sign of the imposed phase shift β(λ) changed such that an imposed phase shift of −β(λ) is applied to the signal at tap B. The direction in which a signal is cancelled will be called the REVERSE direction, but this direction may be dynamically controlled to be either direction on the transmission line (i.e., LEFT or RIGHT). It is also possible to linearly combine two different signals and transmit them simultaneously in different directions on the transmission line by arranging one signal to add in the LEFT direction and cancel in the RIGHT direction and the other signal to add in the RIGHT direction and cancel in the LEFT direction.

Due to reciprocity, the behavior of the directional coupler 100 for transmitting signals also describes the behavior of the directional coupler for receiving signals. The two signal taps A 108 and B 110 can be thought of as a linear array. An array factor that represents a gain for coupling signals between the transmission line 106 and an array of taps applies to both transmission gain and reception gain. A null (or at least a partial null—e.g., reduction of 20 dB or 50 dB or more) in the array factor can be provided in one direction on the transmission line while a useful signal level or even a gain greater than 0 dB or as high as 3 dB, for example, is provided in the other direction. The same imposed phase shifts as calculated above can be used to process signals received at the two taps to recover signals from one direction while blocking signals from the other direction. The signals received at each tap are processed to impose the required phase shifts using a programmable phase rotator on each subcarrier and the two resulting signals may be added together prior to demodulation to suppress and substantially cancel signals that are propagating on the transmission line in one direction while passing or enhancing signals that are propagating the other direction on the transmission line. This enables the directional coupler to simultaneously receive two different signals from opposite directions on the transmission line.

Other implementations of the directional coupler 100 are possible. For example, in some implementations, a single transceiver can provide signals to and receive signals from both taps. In some implementations of the directional coupler, any number of taps (e.g., three or four or more) can be used to provide a dynamically controllable level of destructive interference to null or nearly null signals in one direction and provide non-nulling interference or constructive interference (gain) in the other direction. For example, more than two taps may be used to increase the effective bandwidth over which gain is provided in one direction while nulling the other direction. In some implementations, there is only a single carrier instead of multiple carriers (or "subcarriers").

Figure 3:
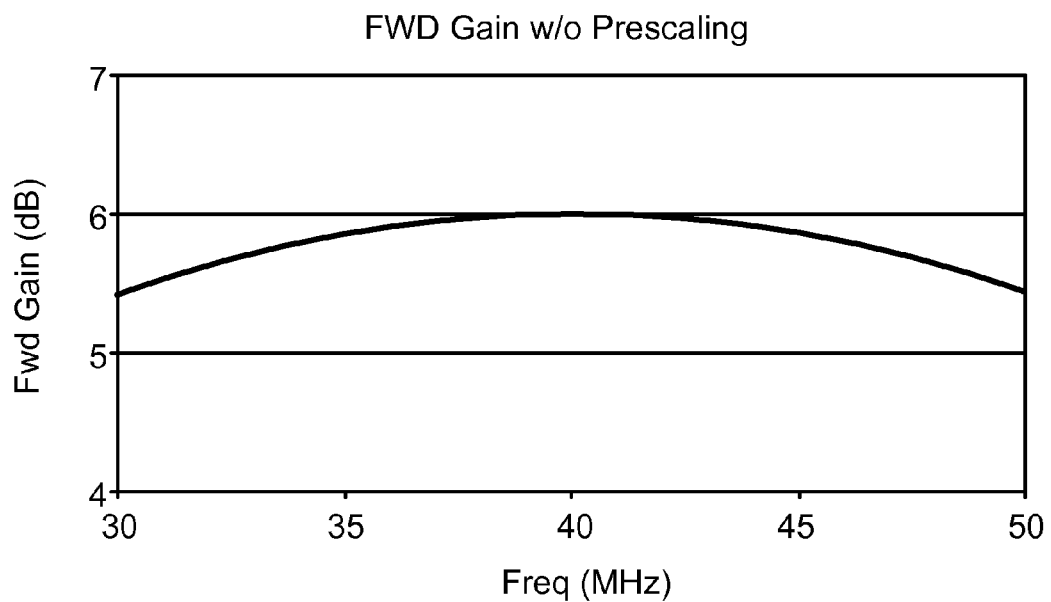
FIG. 3 is a plot of the frequency response of the power line directional coupler system in the forward transmission direction without pre-scaling of the subcarrier signals.

Referring to FIG. 3, if the CANCEL signal is adapted to maximize nulling in the REVERSE direction for each subcarrier within the signal bandwidth, signal gain in the FORWARD direction will not be uniform across the entire signal bandwidth. The INFO and CANCEL signal vectors will combine perfectly in phase on only one of the subcarrier frequencies (e.g., the center subcarrier frequency). Subcarriers not located at band center will have slightly less FORWARD gain. This results in an amplitude taper across the signal bandwidth in the FORWARD direction. FIG. 3 is a plot of signal gain in the forward direction, measured in decibels, as a function of frequency for system that does not use amplitude prescaling. The center subcarrier at 40 MHz experiences a forward gain of approximately 6 dB (3 dB of gain is due to the array factor and 3 dB is due to the fact that twice as much power is being injected into the system relative to a system using a single transceiver). Subcarriers at other frequencies closer to the edges of the signal bandwidth experience reduced forward signal gain due to amplitude taper.

This amplitude taper is generally undesirable because regulatory limits are imposed on transmitted power. If the signal at band center is held within regulatory limits, the signal at band edge will be further suppressed due to the aforementioned amplitude taper.

Figure 4:
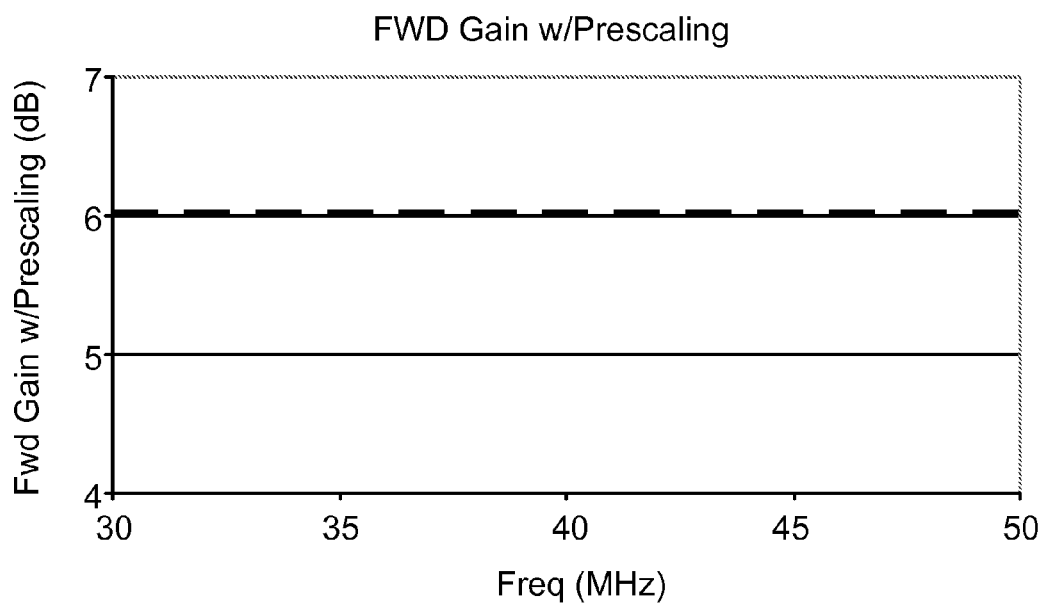
FIG. 4 is a plot of the frequency response of the power line directional coupler system in the forward transmission direction with pre-scaling of the subcarrier signals.

Referring to FIG. 4, the INFO signal may be prescaled in amplitude to compensate for this amplitude taper across the signal bandwidth. In this case, amplitude prescaling is accomplished by inverting the gain curve in FIG. 3 and normalizing gain at band center to 0 dB. When the prescaled signal is injected into the directional coupler, the result is an ideal flat gain across the entire signal bandwidth as shown in FIG. 4.

Figure 5:
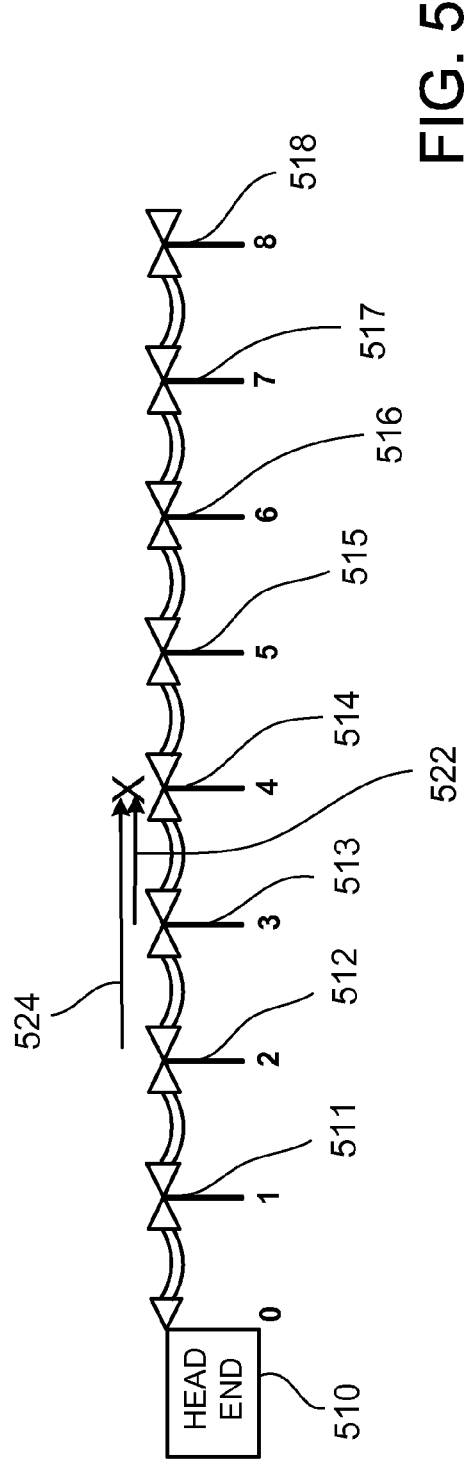
FIGS. 5, 7A, 7B, and 8 are schematic diagrams of a transmission line with repeaters.

Referring to FIG. 5, the ability to send a packet in one selectable direction (and cancel that signal in the other direction) helps mitigate the hidden node problem, but it does not eliminate it. Consider the scenario depicted in FIG. 5 showing a head end transceiver 510 (Node 0) and a series of eight pole top repeaters 511-518 (Nodes 1-8 respectively). If Node 3 is sending a packet 522 to Node 4 by means of a directional coupler, Nodes 0-2 would be blind to the directional transmission. It would be possible for Node 2 to commence a transmission 524 to Node 4 while the transmission of a packet 522 from Node 3 is still in progress.

Figure 6:
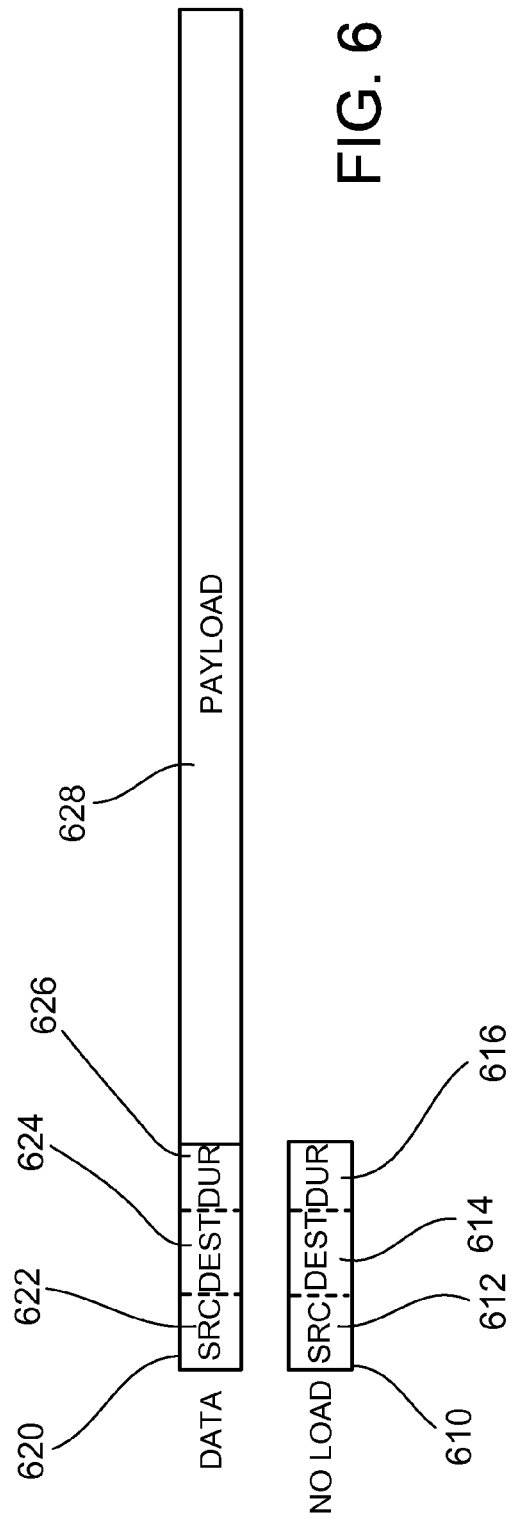
FIG. 6 is diagram showing the format of a data bearing packet and a no-load packet.

In order to resolve the hidden node problem described above, a packet of very brief duration may be used in the medium access procedure. This medium access protocol packet contains Source, Destination, and Duration information of a directional transmission. The access protocol packet does not include a payload, and is therefore designated a "NOLOAD" packet for descriptive purposes. FIG. 6 shows a NOLOAD packet 610 which does not have a payload, and a DATA packet 620 which does have a payload 628. In addition to its payload 628, the DATA packet 620 includes a header including a source field 622, a destination field 624, and a duration field 626. The NOLOAD packet includes a source field 612, a destination field 614, and a duration field 616. The NOLOAD packet 610 is sent in the REVERSE direction in order to notify stations that a directed transmission of the DATA packet 620 in the FORWARD direction is in progress. Packets that would otherwise result in a collision may be queued until the directed DATA packet transmission (from transmitting node to receiving node) and ensuing acknowledgement (ACK) packet transmission (from receiving node to transmitting node) are complete.

Figure 7A:
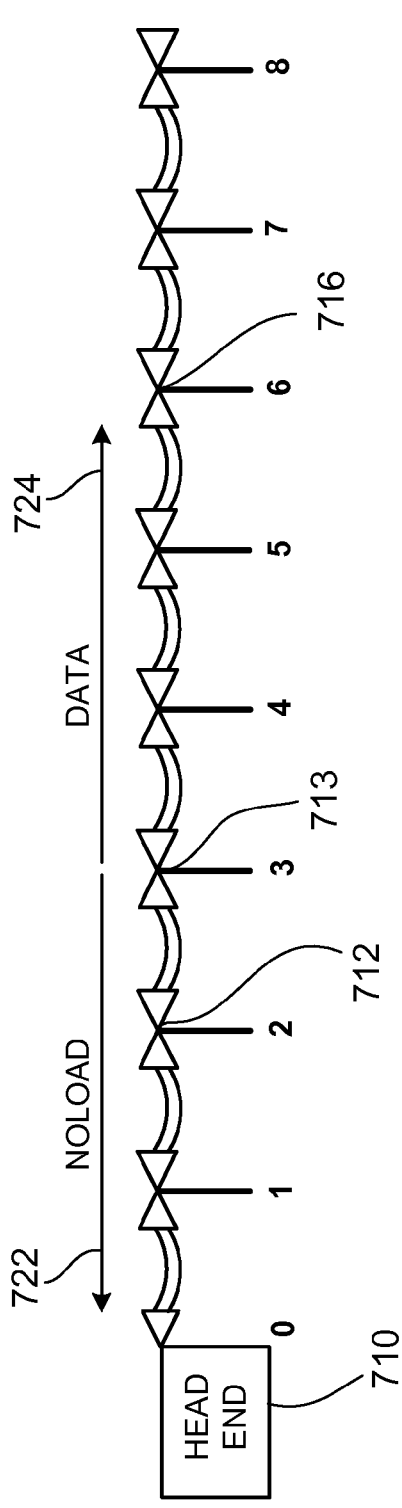

Referring to FIG. 7A, a NOLOAD packet 722 ("NOLOAD-A") is sent at the start of transmission of the directed DATA packet 724 ("DATA-A") as shown. However, there may be other traffic in progress at that point in time. The NOLOAD packet would not be sent when it would collide with an ongoing transmission. Instead, it may contend for the medium using the CSMA-CA protocol. For medium arbitration purposes, the NOLOAD packet should have a higher priority than a data packet, but a lower priority than an ACK packet.

Once NOLOAD-A 722 is sent, DATA-A 724 is protected from potential interference from upstream sources, while upstream bandwidth may still be reused to the extent it does not overlap in space and direction of propagation with the reserved bandwidth. For example, signals may be transmitted in the upstream direction by any station and any station outside the listening range of the destination node for DATA-A may also send transmissions in the downstream direction. An exemplary scenario for bandwidth reuse is described below.

At time $t_0$, the source node 713 senses that the medium is in the idle state. Later at time $t_1$, the source node 713 commences transmission of DATA-A 724 to a downstream destination node 716 and transmits NOLOAD-A 722 to upstream nodes. At time $t_2$, transmission of NOLOAD-A is completed. At time $t_3$, the head end 710 begins transmission of a second data packet to another node 712 which is upstream from the destination node for DATA-A. The second data packet is able to be sent without interfering with the DATA-A reception because, in this scenario, the head end 710 is outside of the listening domain or range of the destination node 716. At time $t_4$, the second destination node 712 sends an ACK message back to the head end 710. At time $t_5$, the first destination node 716 sends an ACK message back to the first source node 713. No collisions occur in the course of the preceding scenario.

Figure 7B:
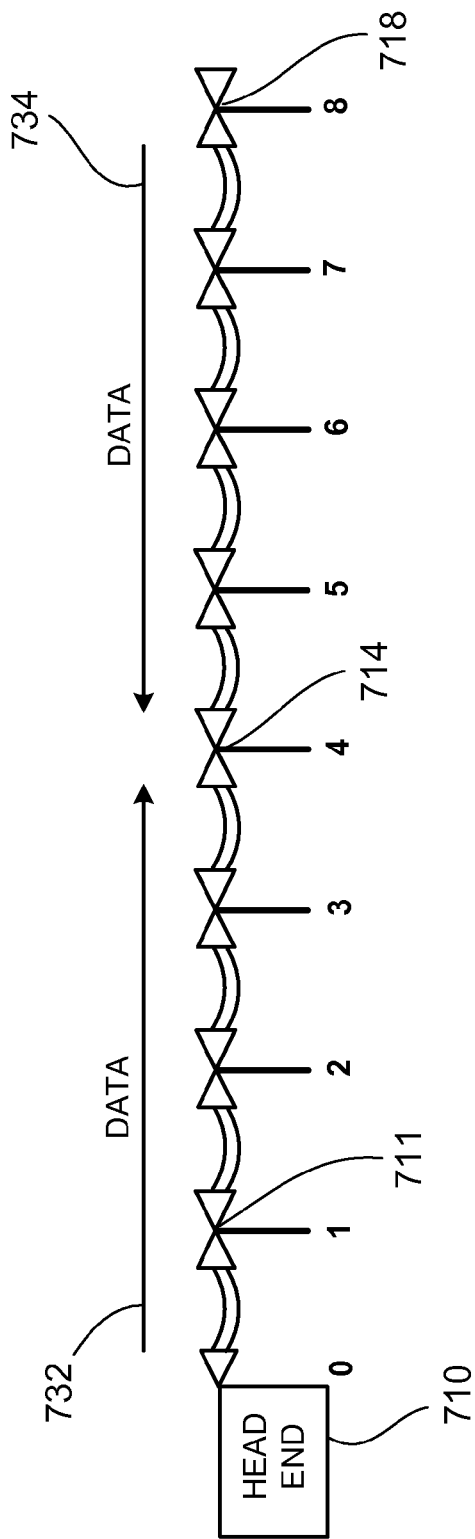

FIG. 7B shows a second scenario in which multiple listening domains are present. Recall that a node suitably equipped with a directional coupler is able to simultaneously transmit in both directions or simultaneously receive in both directions. In this scenario, when transmitting two different DATA packets 732 and 734 (DATA-A and DATA-B) in opposite directions, the NOLOAD packet for one direction (NOLOAD-A) can be sent along with a DATA packet (DATA-B) being transmitted in the other direction, and vice versa. This pairing may be accomplished by adding optional fields representing NOLOAD-A to the header for DATA-B. Alternatively the pairing may be accomplished by appending NOLOAD-A packet to transmission for DATA-B before the delay for channel relinquishment under the CSMA-CA protocol has expired. An exemplary scenario for this form of bandwidth reuse is described below.

At time $t_0$, the medium is in the idle state. Later at time $t_1$, a first source node 711 commences transmission of DATA-A 722 in the downstream direction to destination node 714. A second source node 718 simultaneously commences transmission of DATA-B 724 in the upstream direction to the same destination node 714. At time $t_2$, the destination node simultaneously commences transmission of ACK messages to both source nodes 711 and 718 in their respective directions. At time $t_3$, the destination node 714 commences a forwarding transmission of DATA-A in the downstream direction to a secondary destination node 718. The destination node 714 simultaneously commences a forwarding transmission of DATA-B in the upstream direction to another secondary destination node 710. At time $t_4$, the secondary destination nodes 710 and 718 simultaneously transmit ACK messages back to the forwarding node 714, which simultaneously receives the two ACK messages propagating in their respective directions on the medium. No collisions occur in the course of the preceding scenario.

Figure 8:
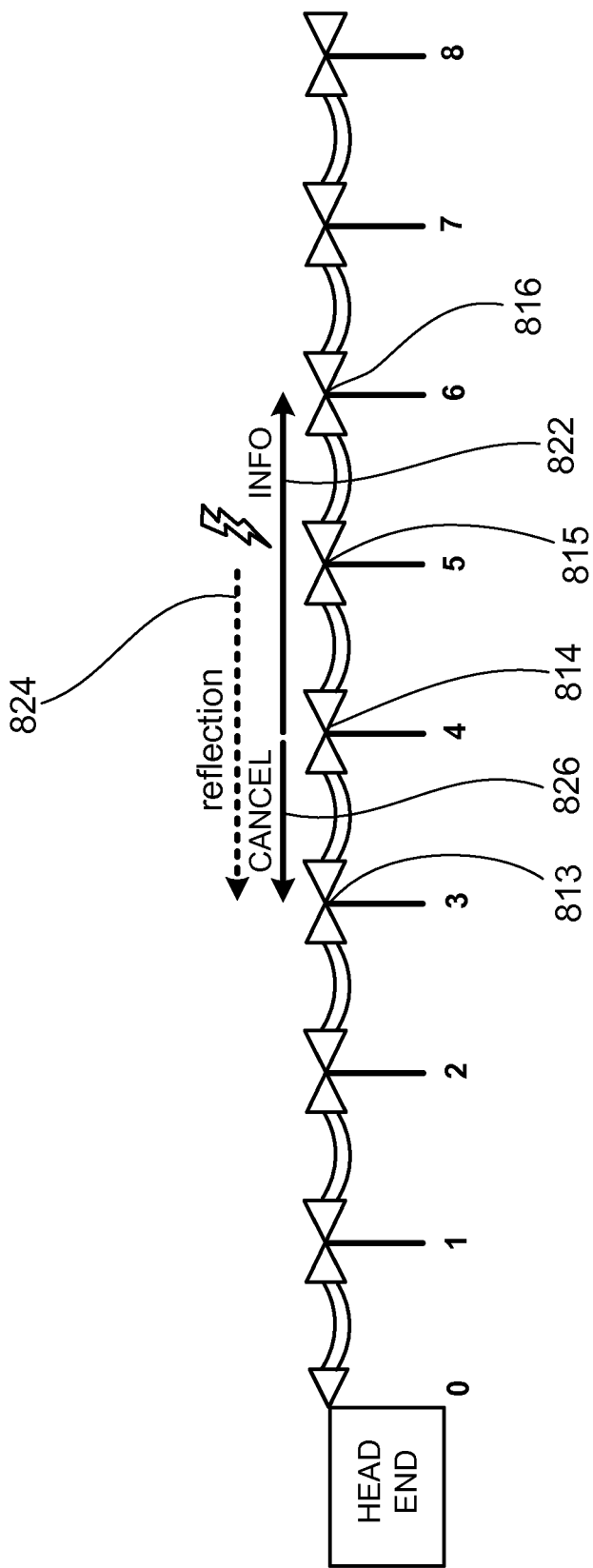

Referring to FIG. 8, additional techniques can be used to account for the fact that power lines are not necessarily ideal transmission lines for signals operating in the 2-80 MHz range. For example, it is possible to have large signal reflections due to impedance mismatches. If such a reflection occurs in the FORWARD direction of a directional transmission, the reflected signal could then propagate in the REVERSE direction. This may reduce the ability of the directional couplers at each node to provide signal nulling in the REVERSE direction. In addition, line conditions are not static. Changes in temperature, weather, or load conditions can alter the propagation characteristics of a transmission line. Therefore, the use of fixed phase shifts based solely on subcarrier frequency and the tap spacing may not result in optimal signal cancellation in the REVERSE direction or maximize signal gain in the FORWARD direction.

To improve the reverse signal cancellation and/or forward gain, feedback from the nearby stations in the REVERSE and/or FORWARD directions may be exploited. Referring again to FIG. 8, a data packet 822 is transmitted downstream from source node 814 to a destination node 816 (FORWARD direction being left-to-right in this case). However, part of the signal 824 is reflected back in the reverse direction by an impedance mismatch near another node 815 along the signal path. In this case, the composite signal in the REVERSE direction measured at an upstream node 813 would consist of:

a.) the INFO signal 822 from the source node 814;
b.) the CANCEL signal 826 from the source node 814; and
c.) the reflected signal 824 from the impedance mismatch near downstream node 815

If the composite signal in the REVERSE is measured at the upstream node 813, degradation in the signal null could be detected. If this information is further communicated to the source node 814 as feedback, adaptive measures could be taken to adjust the CANCEL signal 826 at the source node to restore the signal null in the reverse direction to it's original value. This may require manipulation of the CANCEL signal in both amplitude and phase. This may result in a trade-off between REVERSE direction nulling and FORWARD gain flatness. In general, deep signal nulls may require a very high degree of phase and amplitude control over the CANCEL signal. Relatively slight variations in local propagation conditions can have significant adverse impact on REVERSE signal null depths. In order to achieve consistently deep signal nulls in the REVERSE directions, the directional coupler can be configured to use adaptive methods for selecting the amplitudes and/or phases of the subcarriers.

Feedback signals may be communicated from a measuring node to an adapting node, in the example above from measuring node 813 to adapting node 814, by control signaling on the transmission line. This control signaling may use the same frequency band as higher network layer data signals, for example by encoding feedback information in a logical subchannel of transmissions from 813 to 814. Alternatively, feedback information may be transmitted out of band in a dedicated frequency band or timeslot allocated to PHY layer control signaling.

Many other implementations other than those described above are within the invention, which is defined by the following claims.

What is claimed is:

1. An apparatus, comprising: multiple transmission line taps including a first tap and a second tap coupled to a transmission line, wherein a distance between the first and second taps is associated with a center wavelength corresponding to a center of a bandwidth over which a spectrum of a signal spans; and a signal processing unit in communication with each of the taps, the signal processing unit configured to control a phase for at least a first portion of a signal transmitted by the first tap and to control a phase for a corresponding second portion of the signal transmitted by the second tap, wherein the phases of the first and second portions of the signal are controlled to provide gain in an array factor for signals propagated in a forward transmission direction on the transmission line, and wherein the phases of the first and second portions of the signal are controlled to provide at least a partial null in the array factor for signals propagated in a reverse transmission direction on the transmission line.

2. The apparatus of claim 1, wherein controlling the phase for the first portion of the signal comprises determining the phase based at least in part on a direction in which the signal is to be coupled between the taps and the transmission line.

3. The apparatus of claim 2, wherein controlling the phase for the first portion of the signal comprises determining a sign of the phase based at least in part on the direction.

4. The apparatus of claim 1, wherein controlling the phase for the first portion of the signal comprises controlling the phase to tune an amplitude of a combined signal from the taps that propagates away from the taps in the forward and reverse transmission directions.

5. The apparatus of claim 4, wherein tuning the amplitude of the combined signal comprises reducing the amplitude of the combined signal in the reverse transmission direction.

6. The apparatus of claim 4, wherein tuning the amplitude of the combined signal comprises increasing the amplitude of the combined signal in the forward transmission direction.

7. The apparatus of claim 1, wherein the signal processing unit is further configured to control an amplitude of the first portion of the signal transmitted by the first tap relative to an amplitude of the corresponding second portion of the signal transmitted by the second tap.

8. The apparatus of claim 1, wherein the signal comprises multiple subcarriers, and the signal processing unit is configured to determine a phase for each subcarrier transmitted by the first tap relative to a phase for a corresponding subcarrier transmitted by the second tap.

9. The apparatus of claim 8, wherein the corresponding subcarrier transmitted by the second tap has the same frequency as the subcarrier for the first tap.

10. The apparatus of claim 8, wherein the signal processing unit is configured to determine a phase and an amplitude for each subcarrier transmitted by the first tap relative to a phase and an amplitude of a corresponding subcarrier transmitted by the second tap.

11. The apparatus of claim 1, further comprising multiple transceivers each coupled to a respective one of the taps and coupled to the signal processing unit.

12. The apparatus of claim 1, further comprising a transceiver coupled to each of the taps and coupled to the signal processing unit.

13. The apparatus of claim 1, wherein controlling the phase for the first portion of the signal transmitted by the first tap comprises controlling the phase to be equal to a difference between a constant term and a term associated with a frequency of the first portion of the signal and a distance between the first and second taps on the transmission line.

14. The apparatus of claim 13, wherein the frequency of the first portion of the signal corresponds to a frequency at a peak of a spectrum of the first portion of the signal.

15. The apparatus of claim 13, wherein the first portion of the signal comprises a subcarrier of the signal.

16. The apparatus of claim 1, wherein the distance between the first and second taps is equal to the center wavelength divided by four.

17. The apparatus of claim 1, wherein the signal processing unit is configured to determine a signal strength for each subcarrier for the reverse transmission direction on the transmission line and to determine amplitudes and phases for each subcarrier for each of the taps that provide at least a partial null in the array factor for signals propagated on the transmission line away from the first and second taps in the reverse transmission direction.

18. The apparatus of claim 17, wherein the determined signal strength is provided as feedback based on a signal strength received from a device coupled to the transmission line in the reverse transmission direction.

19. The apparatus of claim 18, wherein the signal processing unit is configured to use the feedback to adaptively control subcarrier amplitudes and phases to compensate for changes in characteristics of the transmission line.

20. The apparatus of claim 1, wherein the signal processing unit is configured to determine a signal strength for each subcarrier for the forward transmission direction on the transmission line and to determine amplitudes and phases for each subcarrier for each of the taps that provide at least some gain in the array factor for signals propagated on the transmission line away from the first and second taps in the forward transmission direction.

21. The apparatus of claim 1, wherein the signal processing unit is configured to transmit signals from the first and second taps to the transmission line according to the array factor.

22. The apparatus of claim 1, wherein the signal processing unit is configured to receive signals from the transmission line to the first and second taps according to the array factor.

23. The apparatus of claim 1, wherein the signal processing unit is configured to:
determine a first set of amplitude values for modulating each subcarrier of a first signal to be transmitted from the first tap, and determine a first set of phase values for modulating each subcarrier of the first signal; and
determine a second set of amplitude values for modulating each subcarrier of a second signal to be transmitted from the second tap based on the first set of amplitude values, and determine a second set of phase values for modulating each subcarrier of the second signal based on the first set of phase values.

24. The apparatus of claim 23, wherein each phase value in the second set of phase values is equal to the phase value of the same subcarrier in the first set of phase values offset by a relative phase shift that is controlled by the signal processing unit.

25. The apparatus of claim 23, wherein each amplitude value in the second set of amplitude values is equal to the amplitude value of the same subcarrier in the first set of amplitude values.

26. The apparatus of claim 23, wherein each amplitude value in the second set of amplitude values is equal to the amplitude value of the same subcarrier in the first set of amplitude values scaled by a factor that at least partially compensates for an amplitude taper over a bandwidth over which the spectrum of the signal spans, where the amplitude taper corresponds to a difference between a frequency of a subcarrier and a center frequency of the bandwidth.

27. The apparatus of claim 23, wherein the signal processing unit is configured to transmit the first signal from the first tap and transmit the second signal from the second tap at the same time.

28. The apparatus of claim 1, wherein the signal processing unit is configured to:
determine a first set of phase values for processing each subcarrier of a first signal received from the first tap; and
determine a second set of phase values for processing each subcarrier of a second signal received from the second tap based on the first set of phase values.

29. The apparatus of claim 28, wherein the signal processing unit is configured to receive the first signal from the first tap and receive the second signal from the second tap at the same time.

30. The apparatus of claim 29, wherein the signal processing unit is configured to process a subcarrier of the first signal using a phase value from the first set of phase values to recover a first vector, process a corresponding subcarrier of the second signal using a phase value from the second set of phase values to recover a second vector, and combine the first and second vectors according to a relative phase to recover a data value.

31. The apparatus of claim 30, wherein the signal processing unit is configured to control the relative phase according to a direction in which the data value is being received from a transmission line coupled to the taps.

32. The apparatus of claim 1, wherein the signal processing unit is configured to simultaneously transmit a first signal in one direction on a transmission line coupled to the taps and transmit a second signal different from the first signal in another direction on the transmission line.

33. The apparatus of claim 1, wherein the signal processing unit is configured to simultaneously receive a first signal from one direction on a transmission line coupled to the taps and receive a second signal different from the first signal from another direction on the transmission line.

34. A method, comprising: coupling a first signal onto a transmission line at a first tap and a second signal onto the transmission line at a second tap, wherein a distance between the first and second taps is associated with a center wavelength corresponding to a center of a bandwidth over which a spectrum of the first and second signals spans; and controlling phases for at least a portion of the first signal and a corresponding portion of the second signal, wherein the phases of the first and second signals are controlled to provide gain in an array factor for signals propagated in a forward transmission direction on the transmission line, and wherein the phases of the first and second signals are controlled to provide at least a partial null in the array factor for signals propagated in a reverse transmission direction on the transmission line.

35. The method of claim 34, wherein the first and second signals represent a payload bearing packet in the forward transmission direction, the method further comprising:
transmitting, from the apparatus, a notification packet in the reverse transmission direction, the notification packet indicative that the payload bearing packet is being transmitted in the forward transmission direction.

36. The method of claim 35, wherein the notification packet comprises one or more of a source address, a destination address, and a time duration of transmission.

37. The method of claim 35, wherein the notification packet is prioritized below acknowledgement packets and above payload bearing packets for accessing the transmission line according to a medium access protocol.

38. The method of claim 35, wherein the notification packet is combined with a different payload bearing packet being transmitted in the reverse transmission direction.

39. The method of claim 35, wherein said transmitting the notification packet occurs at least partially concurrently with the payload bearing packet being transmitted in the forward transmission direction.

40. The method of claim 34, wherein controlling the phase for the portion of the first signal comprises determining the phase based at least in part on a direction in which the signal is to be coupled between the taps and the transmission line.

41. The method of claim 40, wherein controlling the phase for the portion of the first signal comprises determining a sign of the phase based at least in part on the direction.

42. The method of claim 34, wherein controlling the phase for the portion of the first signal comprises controlling the phase to tune an amplitude of a combined signal from the taps that propagates away from the taps in the forward and reverse transmission directions.

43. The method of claim 42, wherein tuning the amplitude of the combined signal comprises reducing the amplitude of the combined signal in the reverse transmission direction.

44. The method of claim 42, wherein tuning the amplitude of the combined signal comprises increasing the amplitude of the combined signal in the forward transmission direction.

45. The method of claim 34, further comprising controlling an amplitude of the portion of the first signal transmitted by the first tap relative to an amplitude of the corresponding portion of the second signal transmitted by the second tap.

46. The method of claim 34, wherein the signal comprises multiple subcarriers and the method further comprises determining a phase for each subcarrier transmitted by the first tap relative to a phase for a corresponding subcarrier transmitted by the second tap.

47. The method of claim 46, wherein the corresponding subcarrier transmitted by the second tap has the same frequency as the subcarrier for the first tap.

48. The method of claim 46, further comprising determining a phase and an amplitude for each subcarrier transmitted by the first tap relative to a phase and an amplitude of a corresponding subcarrier transmitted by the second tap.

49. The method of claim 34, wherein controlling the phase for the portion of the first signal transmitted by the first tap comprises controlling the phase to be equal to a difference between a constant term and a term associated with a frequency of the portion of the first signal and a distance between the first and second taps on the transmission line.

50. The method of claim 49, wherein the frequency of the portion of the first signal corresponds to a frequency at a peak of a spectrum of the portion of the first signal.

51. The method of claim 49, wherein the portion of the first signal comprises a subcarrier of the signal.

52. The method of claim 34, wherein the distance between the first and second taps is equal to the center wavelength divided by four.

53. The method of claim 34, further comprising:
determining a signal strength for each subcarrier for the reverse transmission direction on the transmission line; and
determining amplitudes and phases for each subcarrier for each of the taps that provide at least a partial null in the array factor for signals propagated on the transmission line away from the first and second taps in the reverse transmission direction.

54. The method of claim 53, wherein the determined signal strength is provided as feedback based on a signal strength received from a device coupled to the transmission line in the reverse transmission direction.

55. The method of claim 54, further comprising using the feedback to adaptively control subcarrier amplitudes and phases to compensate for changes in characteristics of the transmission line.

56. The method of claim 34, further comprising:
determining a signal strength for each subcarrier for the forward transmission direction on the transmission line; and
determining amplitudes and phases for each subcarrier for each of the taps that provide at least some gain in the array factor for signals propagated on the transmission line away from the first and second taps in the forward transmission direction.

57. The method of claim 34, further comprising transmitting signals from the first and second taps to the transmission line according to the array factor.

58. The method of claim 34, further comprising receiving signals from the transmission line to the first and second taps according to the array factor.

59. The method of claim 34, further comprising:
determining a first set of amplitude values for modulating each subcarrier of a first signal to be transmitted from the first tap;
determining a first set of phase values for modulating each subcarrier of the first signal;
determining a second set of amplitude values for modulating each subcarrier of a second signal to be transmitted from the second tap based on the first set of amplitude values; and
determining a second set of phase values for modulating each subcarrier of the second signal based on the first set of phase values.

60. The method of claim 59, wherein each phase value in the second set of phase values is equal to the phase value of the same subcarrier in the first set of phase values offset by a relative phase shift.

61. The method of claim 59, wherein each amplitude value in the second set of amplitude values is equal to the amplitude value of the same subcarrier in the first set of amplitude values.

62. The method of claim 59, wherein each amplitude value in the second set of amplitude values is equal to the amplitude value of the same subcarrier in the first set of amplitude values scaled by a factor that at least partially compensates for an amplitude taper over a bandwidth over which the spectrum of the signal spans, where the amplitude taper corresponds to a difference between a frequency of a subcarrier and a center frequency of the bandwidth.

63. The method of claim 34, further comprising transmitting the first signal from the first tap and transmitting the second signal from the second tap at the same time.

64. An apparatus, comprising:
multiple transmission line taps including a first tap and a second tap coupled to a transmission line; and
a signal processing unit in communication with each of the taps, the signal processing unit configured to control a phase for at least a first portion of a signal transmitted by the first tap and to control a phase for a corresponding second portion of the signal transmitted by the second tap,
wherein the phases of the first and second portions of the signal are controlled to provide gain in an array factor for signals propagated in a forward transmission direction on the transmission line,
wherein the phases of the first and second portions of the signal are controlled to provide at least a partial null in the array factor for signals propagated in a reverse transmission direction on the transmission line, and
wherein the phase for the first portion of the signal transmitted by the first tap is equal to a difference between a constant term and a term associated with a frequency of the first portion of the signal and a distance between the first and second taps on the transmission line.

65. The apparatus of claim 64, wherein controlling the phase for the first portion of the signal comprises controlling the phase to tune an amplitude of a combined signal from the taps that propagates away from the taps in the forward and reverse transmission directions.

66. The apparatus of claim 64, wherein the signal processing unit is further configured to control an amplitude of the first portion of the signal transmitted by the first tap relative to an amplitude of the corresponding second portion of the signal transmitted by the second tap.

67. The apparatus of claim 64, wherein the frequency of the first portion of the signal corresponds to a frequency at a peak of a spectrum of the first portion of the signal.

68. The apparatus of claim 64, wherein the first portion of the signal comprises a subcarrier of the signal.

69. The apparatus of claim 64, wherein the distance between the first and second taps is equal to the center wavelength divided by four.

70. The apparatus of claim 64, wherein the signal processing unit is configured to simultaneously transmit a first signal in one direction on a transmission line coupled to the taps and transmit a second signal different from the first signal in another direction on the transmission line.

* * * * *